United States Patent
Pingree

(10) Patent No.: US 9,286,399 B2
(45) Date of Patent: Mar. 15, 2016

(54) METADATA MANAGEMENT CONVERGENCE PLATFORMS, SYSTEMS AND METHODS

(71) Applicant: Robert Pingree, Waddell, AZ (US)

(72) Inventor: Robert Pingree, Waddell, AZ (US)

( * ) Notice: Subject to any disclaimer, the term of this patent is extended or adjusted under 35 U.S.C. 154(b) by 0 days.

(21) Appl. No.: 14/675,574

(22) Filed: Mar. 31, 2015

(65) Prior Publication Data

US 2015/0213129 A1 Jul. 30, 2015

Related U.S. Application Data

(62) Division of application No. 11/079,030, filed on Mar. 14, 2005, now abandoned.

(51) Int. Cl.
*G06F 17/30* (2006.01)
(52) U.S. Cl.
CPC .... *G06F 17/30864* (2013.01); *G06F 17/30923* (2013.01); *G06F 17/30997* (2013.01)
(58) Field of Classification Search
None
See application file for complete search history.

(56) References Cited

U.S. PATENT DOCUMENTS

| | | | | |
|---|---|---|---|---|
| 2004/0015514 A1* | 1/2004 | Melton et al. | | 707/103 R |
| 2004/0215629 A1* | 10/2004 | Dettinger et al. | | 707/100 |
| 2005/0102322 A1* | 5/2005 | Bagley et al. | | 707/104.1 |

* cited by examiner

*Primary Examiner* — Hung Q Pham
(74) *Attorney, Agent, or Firm* — Quarles & Brady LLP

(57) ABSTRACT

Metadata management convergence platforms, systems, and methods to organize a community of users' data records are presented. More specifically, methods are presented for managing metadata records related to content housed in unique, disparate or federated holdings in centralized or distributed environments. Also systems and methods for creating and managing metadata records using domain specific language, vocabulary and metadata schema accepted by a community of users of unique, disparate or federated databases in centralized or distributed environments are presented. Such environments can include digital multimedia repositories while providing for, but not limited to: the convergence, enhancement and management of metadata schemas that relate to content, information, networks, devices and users to deliver an interoperable multimedia-driven application infrastructure across a horizontal market.

20 Claims, No Drawings

METADATA MANAGEMENT CONVERGENCE PLATFORMS, SYSTEMS AND METHODS

FIELD OF THE INVENTION

The present invention provides metadata management convergence platforms, systems, and methods to organize a community of users' data records. More specifically, the present invention provides methods managing metadata records related to content housed in unique, disparate or federated holdings in centralized or distributed environments. The present invention also provides systems and methods for creating and managing metadata records using domain specific language, vocabulary and metadata schema accepted by a community of users of unique, disparate or federated databases in centralized or distributed environments. Such environments can include content repositories.

BACKGROUND OF THE INVENTION

Metadata is simply defined as "data about data". Metadata typically describes the content, quality, condition, and/or other characteristics of data. The purposes of metadata include assisting users to organize and maintain an organization's or user community's internal or external investment in spatial data, provide information about an organization's or user community's data holdings to data catalogues, clearinghouses, and brokerages, and provide information to process and interpret data received through a transfer from a unique, disparate or federated external source. Such a source can be centralized or distributed.

By 2005, more than fifty percent (50%) of large organizations will have multiple sources of integration technology. As that proliferation occurs, being able to recognize the use of metadata across different deployment platforms becomes extremely important. Coupled with this proliferation, the explosive growth in personal computers (PCs), servers, Internet related software and web-based holdings has cultivated a need for companies to better understand their internal and external data needs. To better understand these needs, many gigabytes of data must be collected and analyzed to arrive at the best way to service the user.

Market and industry analysts alike, believe that the Internet will prove to be the most significant innovation in modern history since the light bulb and automobile. With regard to the communication of consumer related data, the Internet will quickly surpass or encompass traditional radio and television.

The method in which daily business operations are performed will be changed forever due to this new technology. Many technology based companies in the computer industry are scrambling to outline new products and services using and exploiting the Internet as a vehicle to increase market share and revenue, while increasing productivity and cutting operational costs.

In an effort to meet the above needs of ingesting the vast amounts of information on the web, companies have designed many browsers and millions of web pages to access, retrieve and utilize this information. In addition to the Internet, companies have set up local "intranets" for storing and accessing data for running their organizations. However, the sheer amount of available information is posing increasingly more difficult challenges to conventional approaches.

A major difficulty to overcome is that information contained on the web or web pages are often dispersed or distributed across the network at many sites. Networks themselves may be unique, disparate or federated situated in either centralized or distributed environments. It is often time-consuming for a user to visit all these sites. One conventional approach used to access this information more effectively is called a search engine. A search engine is actually a set of programs accessible at a network site within a network, for example a local area network (LAN) at a company or the Internet and World Wide Web. One program, called a "robot" or "spider," pre-traverses a network in search of documents and builds large index files of keywords found in the documents.

A user of the search engine formulates a query comprising one or more keywords and submits the query to another program of the search engine. In response, the search engine inspects its own index files and displays a list of documents that match the search query, typically as hyperlinks. When a user activates one of the hyperlinks to see the information contained in the document, the user exits the site of the search engine and terminates the search process.

Examples of various search engine methods include:

Brin et al., U.S. Pat. No. 6,678,681, Gomes et al., U.S. Pat. No. 6,615,209, and Bharat et al., U.S. Pat. No. 6,526,440 discloses various search engine strategies and data extraction methods where the database itself is the Internet or network of websites such as the World Wide Web.

Search engines, however, have their drawbacks. For example, a search engine is oriented to discovering textual information only both weighted and non-weighted. In particular, they are not well-suited to indexing information contained in structured or unstructured databases, such as, relational databases, voice related information, audio or video related information, and metadata. Moreover, mixing data from incompatible data sources is difficult in conventional search engines.

Another disadvantage with conventional search engines is that irrelevant information is aggregated with relevant information. For example, it is not uncommon for a search engine on the web to locate hundreds of thousands of documents in response to a single query. Many of those documents are found because they coincidentally include the same keyword in the search query. Sifting through search results in the thousands, however, is a daunting task.

Accordingly, inventors of the present invention have determined that there is a need to be able to effectively collect the data and/or provide useful information indicative of events occurring on the web in a specified format that will speed up the collection of data, identify more clearly what data is required, and capture information about the data to make reporting more accurate. This specified format for collection is also changeable and/or expandable. For example, data which indicates where a user has been in prior sessions may be useful in designing future products accessible via and for the web. The inventors of the present invention have also determined that there is a need for a convergence platform architecture, system and methods to support and analyze Internet, electronic learning and/or electronic commerce data over or from the World Wide Web.

Inventors of the present invention have further determined that there is the need for a convergence platform architecture, system and methods used to correlate user, application, and access functions. Further, it is also determined that there is a need to provide tool sets that can easily communicate with, or become subsets of, an existing scaleable data warehouse to provide Internet decision support, electronic learning and information management. Unfortunately, conventional architectures and/or techniques are unable to organize and present this information in an efficient manner. Many attempts in the prior art include the following:

Ignat, et al., in U.S. Pat. No. 6,611,838 discloses a method of managing metadata via a metadata exchange platform that allows for a synchronization of databases.

Armatis et al., in U.S. Pat. No. 6,697,822 discloses a method to update data files using metadata consisting of unique record identifiers.

Boothby et al., in U.S. Pat. No. 5,684,990 and Pet et al., in U.S. Pat. No. 5,835,912 discloses methods to synchronize update and transfer data and data records of disparate databases.

Noble et al., in U.S. Pat. No. 5,634,053 discloses a method to create a virtual centralized database of a plurality of interconnected local databases.

Dockter et al., in U.S. Pat. No. 5,678,038 discloses the use of database schemas for the management of classification systems.

Lau et al., in U.S. Pat. No. 6,502,098 discloses of transferring data using data table hierarchy.

With the advances in technology and the increase in the number of applications, the definition of "data" and the formats that data is presented or housed in continues to grow. More generally, data is defined as facts represented in a readable language such as numbers, characters, images, or other methods of recording on a durable medium. Data on its own carries no meaning. Empirical data are facts originating in or based on observations or experiences. A database is a store of data concerning a particular domain. Data in a database may be less structured or have weaker semantics (built-in meaning) than knowledge in a knowledge base. Data and data formats include text, graphics, print document formats (PDF), spreadsheets, presentation slides, digital stored video, objects, and digital stored audio to name only a few. Still, further complicating the definition of data is that, at times, can be combinations of the previously stated data and data format.

Due to the increasing complexity of unique, disparate or federated data warehouses in both centralized and distributed environments, a centralized and declarative management of metadata or metadata records is essential for data warehouse administration, maintenance and usage. Metadata is usually divided into technical and semantic data about data. Typically, current approaches, including those technologies in the previously cited U.S. Patents, only support subsets of these metadata types, such as data movement metadata or multidimensional metadata for On-Line Analytical Processing (OLAP).

OLAP is a category of applications and technologies for collecting, managing, processing and presenting multidimensional data for analysis and management purposes.

To further complicate the environment that the prior art fails in, the current marketplace is inundated with proprietary legacy systems, expensive technology and a plethora of point products. Also, the concept of "registries" is not new. Registries range from automotive parts information to registries for worldwide domain name archives. In today's computer world, registries, such as dictionaries and catalogues, have been around for a long time such as Novell's Directory, Microsoft's Active Directory, and IBM mainframe catalogue. In the United States, the Do-Not-Call Registry is perhaps the best known registry today where users can list their telephone numbers and sales groups are required to inspect the list and not call the listed users. However, these registries address different objectives and business problems.

In particular, the interdependencies between technical and semantic metadata have not yet been addressed sufficiently by the prior art. The representation of these interdependencies form an important prerequisite for the translation of queries formulated at the business concept level to executable queries on physical data.

With regard to specific content housed in a plurality of unique, disparate or federated database environments, the prior art fails in that technologies are directed towards content or a mixture of content and metadata requiring dramatic usage of memory space, personnel inputting time and expensive equipment. Prior art systems such as learning content management systems (LCMS), document management systems or content management systems (CMS) all relate to content itself and the content is housed or synchronized in a centralized site.

The present invention provides for interoperability and increases the utilization of the content that metadata is related to. Embodiments of the present invention provide convergence platforms, systems and methods that are based on standards that are relevant to the users providing context to their jobs and organizations.

SUMMARY OF THE INVENTION

Broadly defined, a metadata schema is at least one set of metadata specifications, parameters and standards combined with at least one set of domain specific language and vocabulary both sets accepted by a community of users of unique, disparate or federated databases in centralized or distributed environments.

An embodiment of the present invention discloses a method to provide a metadata convergence platform comprising the steps of:

establishing at least one metadata schema;
creating at least one metadata record based on the at least one metadata schema;
delivering the created at least one metadata record to a user.

A exemplary embodiment of the present invention provides said delivering step in formats such as user accessible databases, repositories, digital archives, analog archives or digital holdings.

Quality control of metadata output is now an important process that the prior art does not fully address. Quality control can include but is not limited to review, edit modification, security screening, privacy, filtering and other document control or access control measures.

Another embodiment of the present invention discloses a method to provide a metadata convergence metadata management system comprising the steps of:

establishing at least one metadata schema;
creating at least one metadata record based on the established at least one metadata schema;
submitting the created at least one metadata record to a staging area database for quality control acceptance;
delivering the accepted, created at least one metadata record to a user.

An additional embodiment of the present invention discloses methods to provide unique metadata management methods that are directed towards metadata related to content itself rather than directed to specific content housed in a plurality of unique, disparate or federated database environments. Prior art systems such as learning content management systems (LCMS), document management systems or content management systems (CMS) all relate to content itself or content housed or synchronized in a centralized site.

Using such methods of the present invention provides a method for a user to economically and quickly poll or search created, accepted metadata based on established metadata schema.

Characteristics of metadata schema include but are not limited to standards, rules, specifications, parameters, attributes, semantics, vocabulary, semantics and jargon accepted by a community of users of unique, disparate, or federated holdings in centralized or distributed environments.

An embodiment of the present invention discloses a method to provide a searchable metadata convergence platform comprising the steps of:
- identifying characteristics related to at least one metadata schema;
- creating at least one metadata record based on the identified characteristics;
- submitting the created at least one metadata record to a staging area database for quality control acceptance;
- delivering the accepted created at least one metadata record to a user;
- polling said delivered metadata record;
- submitting polling results to the user.

It is also contemplated by the teachings of the present invention to include the automatic creation of metadata records related to the content of established unique, disparate or federated holdings.

An embodiment of the present invention has said delivering step as a user accessible database holding at least one metadata record.

Another embodiment of the present invention has said polling as a keyword search query.

Yet another embodiment of the present invention has said submitting polling results as a display on a user's computer monitor.

An embodiment of the present invention discloses a method to provide a metadata convergence platform comprising the steps of:
- identifying at least one metadata schema;
- automatically ingesting metadata into at least one metadata record based on the at least one metadata schema;
- delivering the at least one metadata record to a user.

It is further contemplated by the teachings of the current invention to dynamically generate metadata records based on created or established metadata schema. Such generation utilizes standards and database tags, including but not limited to vocabulary, and servlets, accepted by a community of users of unique, disparate or federated database holdings. Servlets include but are not limited to programs that extend the functionality of a given environment. In terms of learning environments and web applications, servlets are to Web Servers what applets are for Web Browsers: just as applets extend the functionality of a browser, so do servlets (typically written in Java) add functions to Web Servers. Servlets are generated using special development kits such as delivered with the XML tools.

An embodiment of the present invention discloses a method to provide a metadata convergence platform comprising the steps of:
- selecting at least one established metadata schema;
- dynamically generating at least one metadata record using the said metadata schema;
- delivering the generated at least one metadata record to a user.

The user environment is inundated with proprietary legacy systems, expensive technology and a plethora of point products.

To address these business problems, it is further contemplated by the present invention that established metadata schema or standards-based approaches include but are not limited to XML, SCORM, Web Services, RDF, and OWL as generally defined in the following paragraphs.

XML, eXtensible Markup Language. A widely used standard from the World Wide Web Consortium (W3C) that facilitates the interchange of data between computer applications. XML is similar to the language used for Web pages, the HyperText Markup Language (HTML), in that both use markup codes (tags). Computer programs can automatically extract data from an XML document, using its associated document type definition (DTD), is a collection of XML declarations that, as a collection, defines the legal structure, elements, and attributes that are available for use in a document that complies with the DTD as a guide.

SCORM, Sharable Content Object Reference Model. SCORM is a series of e-learning standards and specifications that specify ways to catalogue, launch and track course objects. SCORM is further described in the detailed description of the invention.

Web Services. Web-based applications that can dynamically interact with other Web applications using an XML message protocol (XMLP) such as SOAP or XML-RPC. SOAP (Simple Object Access Protocol) is a lightweight protocol for exchange of information in a decentralized, distributed environment. It is an XML based protocol that consists of three parts: an envelope that defines a framework for describing what is in a message and how to process it, a set of encoding rules for expressing instances of application-defined datatypes, and a convention for representing remote procedure calls and responses. XML-RPC is a specification and a set of implementations that allow software running on disparate operating systems, running in different environments to make procedure calls over the Internet. It's remote procedure calling using HTTP as the transport and XML as the encoding. XML-RPC is designed to be as simple as possible, while allowing complex data structures to be transmitted, processed and returned.

RDF, Resource Description Framework, is a language for representing information about resources in the World Wide Web. It is particularly intended for representing metadata about Web resources, such as the title, author, and modification date of a Web page, copyright and licensing information about a Web document, or the availability schedule for some shared resource. However, by generalizing the concept of a "Web resource", RDF can also be used to represent information about things that can be identified on the Web, even when they cannot be directly retrieved on the Web. Examples include information about items available from on-line shopping facilities (e.g., information about specifications, prices, and availability), or the description of a Web user's preferences for information delivery. RDF is intended for situations in which this information needs to be processed by applications, rather than being only displayed to people. RDF provides a common framework for expressing this information so it can be exchanged between applications without loss of meaning.

OWL, Web Ontology Language is intended to be used when the information contained in documents needs to be processed by applications, as opposed to situations where the content only needs to be presented to humans. OWL can be used to explicitly represent the meaning of terms in vocabularies and the relationships between those terms. This representation of terms and their interrelationships is called ontology.

Non-limiting definitions of examples of emerging standards for describing, promoting and discovering these services are: ebXML, UDDI, WSDL, and Sun ONE are major implementations of the concept. The goal is to enable one application to find another on the Internet that provides a needed service and to seamlessly exchange data with it. General definitions for ebXML, UDDI, WSDL and Sun ONE follow:

ebXML. Electronic Business using eXtensible Markup Language is a modular suite of specifications that enables enterprises of any size and in any geographical location to conduct business over the Internet. Using ebXML, companies now have a standard method to exchange business messages, conduct trading relationships, communicate data in common terms and define and register business processes.

UDDI. \Universal Description, Discovery and Integration protocol. A directory model for web services. UDDI is a specification for maintaining standardized directories of information about web services, recording their capabilities, location and requirements in a universally recognized format.

WSDL. Web Services Description Language. The standard format for describing a web service. Expressed in XML, a WSDL definition describes how to access a web service and what operations it will perform.

Sun One. Sun Open Net Environment (Sun ONE) is Sun's standards-based software vision, architecture, platform, and expertise for building and deploying services on demand.

Another embodiment of the present invention discloses a method to provide metadata a convergence platform comprising the steps of:
  selecting at least one established metadata schema;
  dynamically generating at least one metadata record using the at least one established metadata schema;
  delivering the at least one metadata record to a user accessible database.

In various computing environments such as the World Wide Web, there will be a need to use metadata from multiple schemas. It is contemplated by the present invention that the convergence platform of the present invention can be characterized as a "semantic web". Semantic web can be generally defined as an abstract representation of data accessible via the World Wide Web, using standards such as RDF. Such a semantic web is an extension of the current web in which information is given well-defined meaning, better enabling computers and users to work in cooperation. Such a platform provides a common framework for expressing information so that data can be exchanged between applications without loss of meaning.

Here the concept that metadata schema is based on data tags, specifications and standards accepted by a community of users of unique, disparate or federated database holdings in centralized or distributed environments expands the scope of the present invention by addressing multiple import and export metadata schemas.

Yet another embodiment of the present invention discloses a method to provide a import-export metadata convergence platform comprising the steps of:
  selecting at least one import metadata schema;
  generating at least one import metadata record using the at least one import metadata schema;
  submitting the at least one import metadata record to a metadata conversion staging area;
  selecting at least one export metadata schema;
  converting the at least one import metadata record into at least one export metadata record based on the at least one export metadata schema;
  delivering the at least one export metadata record to a user.

Another embodiment of the present invention discloses a method to provide a semantic web metadata convergence platform comprising the steps of:
  selecting at least one import metadata schema;
  generating at least one import metadata record using the at least one import metadata schema;
  submitting the at least one import metadata record to a metadata conversion staging area;
  selecting at least one export metadata schema;
  converting the at least one import metadata record into at least one export metadata record based on the at least one export metadata schema;
  submitting the at least one export metadata record to a user.

Again to review, metadata schemas can be selected, established or created by a community of users of unique, disparate or federated holdings in centralized or distributed environments. For example, a metadata schema can be selected from already established schemas based on standards and specifications accepted by a community of users such as SCORM. Metadata schema can be established by selecting an already established schema and also selecting a set of vocabulary, standards or specifications used and accepted by a community of users.

An example of a user established metadata schema could include a government entity selecting SCORM and also a set of entity specific vocabulary such as in-house jargon.

A final example is where the community of users initially selects standards, rules, attributes, vocabulary, specifications and other data related semantics to create a new, user community unique schema. An example of created metadata scheme could include the time when SCORM was first made. Here the initial concept was that metadata schema is created on data tags, specifications and standards accepted by a community of users of unique, disparate or federated database holdings in centralized or distributed environments controlled by the users.

An embodiment of the present invention has the selected, established or created metadata schema containing SCORM as at least a subset of the schema.

Another embodiment of the present invention has the selected, established or created metadata schema containing RDF as at least a subset of the schema.

In accordance with another exemplary embodiment of the present invention, the selected, established or created metadata schema has at least one existing schema as at least a subset of the selected, established or created metadata schema.

Furthermore, in accordance with another embodiment of the present invention, the at least one existing schema as at least a subset of the selected, established or created schema is chosen from the group consisting of SCORM, RDF, XML schemas, XML based schemas, OWL, UDDI, Sun One, WSDL, and ebXML.

Yet another embodiment of the present invention has the selected metadata schema is chosen from the group consisting of SCORM, RDF, XML schemas, XML based schemas, OWL, UDDI, Sun One, WSDL, and ebXML.

In accordance with another embodiment of the present invention has the established metadata schema chosen from the group consisting of SCORM, RDF, XML schemas, XML based schemas, OWL, UDDI, Sun One, WSDL, and ebXML.

In accordance with another embodiment of the present invention, the import metadata schema is selected from the group consisting of SCORM, RDF, XML schemas, XML based schemas, OWL, UDDI, Sun One, WSDL, and ebXML.

Furthermore, in accordance with another embodiment of the present invention, the export metadata schema is selected from the group consisting of SCORM, RDF, XML schemas, XML based schemas, OWL, UDDI, Sun One, WSDL, and ebXML.

Still further, in accordance with another embodiment of the present invention, the established metadata schema is selected from a group of previously created metadata schemas created by a community of database users.

In accordance with yet another embodiment of the current invention the said selecting step is a creating or establishing function.

Furthermore, in accordance with another embodiment of the current invention, the said establishing step incorporates a selecting or creating function.

Still further, in accordance with another embodiment of the present invention said submitting step is a delivering function.

Furthermore, in accordance with another embodiment of the present invention said delivering step is a submitting function.

DETAILED DESCRIPTION OF THE INVENTION

The embodiments of the present invention provide web-based convergence platform tools where the tools are used to manage the metadata about the content, using the standards accepted or adopted by a community of ubiquitous or diverse users of unique, disparate or federated holdings in centralized or distributed environments rather than managing the content itself directly with these tools.

Briefly, one of the embodiments of the present invention contemplates the design, creation or establishment of at least one metadata schema.

A non-limiting example of a metadata schema includes the description of the structure and the rules a document must satisfy for SGML (Standard Generalized Markup Language). SGML is a set of standards for how to specify a document markup language or tag set. SGML is not in itself a document language, but a description of how to specify one. It is a metalanguage. HTML and XML are examples of SGML-based languages or XML document types.

Again, using XML only as a non-limiting example, XML allows us to free information from proprietary software and systems. XML is not so much a language as a standardized set of rules for adding structure to any form of data using a system of markup tags. Anyone can create their own markup vocabulary (called an XML Schema), and XML ensures that the structure will be intelligible to anyone else who consults the XML schema document. More importantly, referring to an XML schema enables XML-aware software to automatically manipulate the data without needing advance knowledge of the structure.

The metadata schema comprises the formal declaration of the elements that make up a metadata record, their mutual coherence, meaning and documentation as drawn up for content type such as text, a document, information model such as a graphic, a table of information or a chart.

Metadata schema is, for example, more flexible than lone DTD files (files that define the elements and data structure contained in an XML document). Because metadata schemas are more flexible, they can also contain rules for content or data types like dates, numbers, bit maps, file extensions, etc.

Another component of the present invention is the registration of metadata which is differentiated from "metadata tagging tools" and "authoring tools". Metadata tagging tools are used to publish metadata related to product records such as card catalog systems that librarians create to catalog books. Authoring tools are used by subject matter experts to create content to be tagged such as a book author creating a table of contents for a publication. These prior art tools deal with content that is archived in centralized storage arenas that require standards that are unique to the storage arena itself rather than the user.

The present invention is differentiated from the prior art that the registration tools contemplated by embodiments of the present invention allow users to create metadata that is centralized and can be shared by multiple users pulling content from unique, disparate or federated holdings in centralized or distributed environments using the characteristics accepted or adopted by a community of diverse users.

Another embodiment of the present invention provides for methods to use several means of locating or accessing information.

A search could include any combination or number of parameters or attributes that were defined in the registration or metadata schema formation process. For example, in an academic learning environment, learning parameters could be used such as subject topic, key word, learning resource type, and learning objective as registered by the community of users.

Search methods of the present invention allow users to poll previously created, established or managed metadata using the standards already accepted or adopted by a community of ubiquitous or diverse users of unique, disparate or federated holdings, rather than polling only the content itself.

An example of a created web-based metadata system incorporating the embodiments of the present invention includes a system that enables registering, editing, deleting, updating, providing review process (e.g. recommendation, rejection, communication), searching, querying, sharing, harvesting, gathering, classifying, locating, exporting, presenting standards-based and domain specific metadata for accessing, collecting (packaging), sharing, delivering, presenting and launching (opening) unstructured data and structured information related to the managed metadata. The registration process related here includes the ability for tagging metadata and/or importing standards-based, domain specific metadata.

Additionally, the collection and management of multiple metadata with associated structured and unstructured information is contemplated by the present invention. The convergence platform system contemplated by the present invention provides duplication processes, definable templates, metadata registration and management methods.

It is further contemplated that the systems contemplated by the present invention provide exporting capabilities of metadata, "collections" of metadata and data in standards-based, interoperability and communication exchange formats such as XML schemas.

More importantly, the exemplary created metadata management system of the present invention provides for manipulation of the "collection" (aka packages) of metadata, domain specific vocabulary, semantics, objects and associated data.

The exemplary convergence platform systems contemplated by the present invention provides the ability to perform bi-directional communication such as query, search, gathering, push, modify, and update with other unique, disparate or federated systems in centralized or distributed environments.

The architecture of the present invention performs all above functions across multiple types of metadata such as the following: objective, subjective, and digital rights; layers of unstructured data such as information or content in multiple formats, learning objects and knowledge; and structured data such as data, metadata and/or metadata schema within databases.

The exemplary systems and methods of the present invention provide the ability to be connected in a federated network architecture of registries and repositories and perform all of the above functions and standards-based interoperability in a federated environment.

An example of a federated environment includes the diverse grouping of agencies, departments, and offices of the governing bodies of the United States. The Department of Defense (DOD) and the White House Office of Science and Technology Policy (OSTP) launched the Advanced Distributed Learning (ADL) Initiative in November 1997. The mission of the ADL initiative is to provide access to the highest quality education and training, tailored to individual needs, delivered cost effectively anytime and anywhere. The ADL Initiative aims to accelerate large-scale development of dynamic and cost-effective learning software and systems and to stimulate the market for these products. This will help meet the expanding education and training needs of government, academia and industry. As a foundation for accomplishing those goals, ADL's Sharable Content Object Reference Model (SCORM) aims to foster creation of reusable learning content as "instructional objects" within a common technical framework for computer and Web-based learning.

SCORM describes a user accepted technical framework by providing a harmonized set of guidelines, specifications, and standards based on the work of several distinct e-learning specifications and standards bodies. These organizations continue to work with ADL, developing and refining their own e-learning specifications and standards and helping to build and improve SCORM.

An embodiment of the present invention includes the incorporation of SCORM as a member of the standards accepted or adopted by a community of diverse users of disparate or federated holdings. An example of such a community may include the following agencies and departments of the United States Government:
Patent and Trademark Office (USPTO);
Internal Revenue Service (IRS);
National Institutes of Health (NIH);
Department of Defense (DOD); and
Department of Homeland Security.

Another embodiment of the present invention includes the creation of a metadata based semantic registry system is an enterprise software application format providing convergence technology that provides content interoperability.

Examples of SCORM community requirements and of a Metadata Based Semantic Registry System (MBSRS) follows:

EXAMPLE 1

Training Technology Development (TTD)

Design and develop an advanced distributed learning (ADL) registry and repository architecture and associated user interfaces to support distributed and federated computing terrorism training repositories.

The architecture must be Shareable Content Object Reference Model (SCORM) 1.3 conformant.

The architecture must be based on a collection of distributed services with Web interfaces and an open component communications model that is consistent with emerging computing and communication infrastructures.

The architecture must support:
content identifier, locator, reference, versioning, search and query;
content management, sharing, and delivery; and
digital rights management, information assurance, and security.

The architecture must provide the capability to federate existing (disparate) SCORM and non-SCORM conformant content repositories.

The architecture must support content object reuse and establish models and procedures such that training materials produced by any agency will be available for reuse across the community.

The architecture must perform all functions across multiple types of metadata (e.g., objective, subjective, rights, etc.) and layers of objects (e.g. learning, content, and knowledge).

The architecture must support customization of information based on domain, for example:
federal, state, and local;
homeland defense, homeland security, and emergency response;
standards organizations and bodies;
federal, state and local sources for training; etc and unique taxonomies within those domains.

The architecture must support establishing and maintaining a customizable metadata framework spanning all identified domains and associated training tasks.

The architecture will be accessible via standard industry web browsers operating on person computer systems with the following minimum system requirements—Pentium II/III or equivalent, 233 MHz, 128 MB RAM, audio and video capable, 16× CD-ROM, 56K modem, with Windows 98, ME, 2002, or XP Operating System.

EXAMPLE 2

Metadata Based Semantic Registry System Description and Requirements

The metadata based semantic registry system (MBSRS) is an enterprise software application and convergence technology that provides content interoperability. MBSRS enables the rapid non-programmatic development along with the deployment of standards-based and domain specific metadata registries. Additionally MBSRS a federated sharable content network architecture. MBSRS further provides customizable user interfaces, business processes, accompanying software codes and communication protocols to facilitate interoperable registration, quality assurance, publishing, search, discovery, packaging, distribution. The architecture yields a highly efficient exchange of information, content and best practices between organizations, systems and people. MBSRS is horizontal market application designed to meet market needs for performance support applications. The diverse usage areas for MBSRS include distributed registry-repository systems development, metadata intensive-dependent application development, performance support, knowledge management, eLearning, advanced distributed learning, document/content management, electronic publishing, information, and clearing houses. Furthermore, the MBSRS provides for digital asset management, content-enabling application infrastructure and networks.

MBSRS architecture is based on industry standard open component communications model that is consistent with emerging computing and communication infrastructures. MBSRS environments can include web-based and database environments that are OS platforms and network agnostic. The architecture can deal with multiple types of metadata, different types of XML schemas and different layers of content.

MBSRS is comprised of three integrated user components: Metadata Schema Development (MSD); Metadata Record Creation (MRC); and MRC Searching.

MSD provides the interfaces and processes for non-programmatic users (normally Information Architecture/Domain Information Experts) to develop and deploy the metadata database for the metadata registry. MRC, provides the interfaces and processes for non programmatic users (used by subject matter experts and content providers) to register, provide quality assurance and publish metadata (stored within the developed and deployed metadata database) and content (stored in distributed repositories, systems and organizations) described and pointed to (referenced) by the metadata. MRC Searching, used by all end users is used to query the metadata stored within the metadata database to search for distributed content, access the content, generate metadata (in XML) of the content in various schemas, and create packages for transporting into other systems.

To deploy the metadata registries system non-programmatic users use a simple three-step process:

First, setup the metadata framework of the metadata database and make the system operation through MSD.

Second, Subject Matter Experts and Content Providers being the process of registering the metadata of distributed objects within the metadata database through MRC. MRC also provides the integrated quality control process of the metadata before it is accepted into the metadata database. The second is an on-going process.

Third, end users access MRC Searching to search, retrieve; access and share content and related metadata from the metadata database.

MSD—The system provides the ability for users without technical background and/or computer programming skills (i.e. non-programmatic users) to create, establish, maintain, modify and administer a metadata database through easy to use web interfaces and built-in business processes. The metadata database can be preloaded with standards-based metadata and accompanying metadata framework, that incorporates a standards-based metadata and domain specific metadata and accompanying metadata framework, and facilitates the management, representation, import/export of the in multiple schemas, without the need for any programming or technical/technology intervention. The metadata and metadata framework include industry specification and reference models for metadata and content interoperability and customizable metadata and metadata framework, unique taxonomies, ontology, organizational objectives and keyword vocabularies spanning all identified domains and application tasks. The system business process include the ability for non-programmatically:

Adding and creating, importing/exporting, modifying, 'taxonomies and ontology' parameters for developing, deploying and maintaining the metadata database of the registry—repository system.

Adding, creating, importing/exporting, modifying, values of 'metadata attributes' and for developing, deploying and maintaining the metadata database of the registry—repository system.

Adding and creating, importing/exporting, modifying, 'organizational objectives' parameters for developing, deploying and maintaining the metadata database of the registry—repository system.

Adding and creating, importing/exporting, modifying controlled vocabulary parameters for developing, deploying and maintaining the metadata database of the registry—repository system.

MSD provides additional functionality to mange users, user groups and also manage URL of external repositories. The metadata and metadata framework of the metadata database created using MSD is automatically reflected in the user interfaces of MRC and MRC Searching.

MRC provides access to metadata registration templates and processes to enable registering, editing, deleting, updating, providing review process (e.g. recommendation, rejection, communication) of metadata of distributed content. The registration process includes the ability for importing standards-based and domain specific metadata in different schemas and collection of multiple metadata and associated content. MRC additionally provides metadata quality control process, duplication process and life cycle management processes.

MRC Searching provides searching, querying, sharing, harvesting, gathering, classifying, locating, exporting, presenting standards-based and domain specific metadata for accessing, collecting (packaging), sharing, delivering, presenting and launching (opening) distributed content related to the metadata registered and stored within the metadata database.

In addition, MRC Searching provides exporting capabilities of metadata and the 'collection' of metadata and content in standards-based interoperability and exchange formats (different XML schema). The export formats (schemas) incorporate standards-based metadata with customizations and extensions to standards that include domain specific metadata, taxonomies, ontology and organizations objectives and keyword vocabularies. MRC Searching provides for manipulation of the 'collection' (a.k.a. packages) of metadata and associated data.

The system provides the ability to be connected in a federated network architecture of registries and repositories and perform all of the above functions and standards-based interoperability in a federated environment. MBSRS provides the ability to perform bi-directional communication (e.g. query, search, gathering, push, modify, update) with other systems.

EXAMPLE 3

Building Metadata Schema

Descriptive framework built accordance with an embodiment of the present invention has metadata schema designed to align with emerging standards for labelling information, including the SCORM, IEEE LOM, and the metadata elements and vocabularies specific to an organization. An example of features of building metadata schema include two items for administration and review functions. The administration feature allows the user to manage user accounts, build the taxonomic structure, create and manage the keywords, using both closed or open vocabulary, integrate performance or learning standards, compose the metadata attributes, view objects associated with specific attributes, and manage the staging database. The review feature allows the Administrators to review metadata records in the a staging area to perform quality control measures.

EXAMPLE 4

Registration of Metadata Using SCORM

Embodiments of the present invention allow users register the metadata about objects. The registration process begins by identifying an object's significant attributes. These attributes are captured in the metadata record (form containing the descriptors about the object). Status functions contemplated by the present invention allow the user who submitted registration forms to track their submitted objects. The import feature permits the user to browse the local machine or the local area network for SCORM conformant objects in the form of SCORM conformant metadata XML documents or SCORM conformant content packages. Once uploaded, these records reside in the temporary staging area until reviewed by the user. The template feature provides the tools to create a personal or public template used for multiple objects with similar metadata attributes. While creating a content package, the user can view the objects within the package being built and defined.

EXAMPLE 5

Searching Submitted Metadata Records and XML Conversion of Objects

Embodiments of the present invention enables the discovery and contextual utilization of objects. Four possible methods currently contemplated by the present invention for locating and accessing objects based on the metadata as searchable properties. Each method of search, i.e., Taxonomic Path (Category), Keyword, Objective, and Attribute, provides an Object List based on relationships through metadata. Users use the Category (Taxonomic Path), Keyword, Objective, and Attribute search in polling contemplated by the present invention.

Additionally, an embodiment of the present invention allows for the methods to create XML documentation for objects in real-time. A designated user can also locate objects from multiple search queries, select appropriate distributed or centralized objects and create data packets to be imported into other applications. Users can also structure the order of those objects to position for sequencing within systems like an LMS or LCMS.

EXAMPLE 6

SCORM Content Packages as Data Packets

The content packaging defines a standardized method to exchange content. A Content Package is created to share content among other SCORM conformant applications or systems. A Content Package is an abstract description of a unit of useable (and reusable) objects. The main elements of a Package are: a Manifest file, the physical objects and the XML metadata file of the physical objects.

If the physical objects are distributed then the XML metadata file also contains the location information. A manifest tag is contemplated by the present invention to serve a similar role to a "packing slip" by listing all objects used by the content package. The physical objects are a collection of objects physically accompanied with their metadata and included within a content package.

Embodiments of the present invention provide methods to create a content package by adding objects to a package in a zip file, arranging the order of the objects within the content package, and describing the contents of the package based on IMS specifications as part of SCORM. IMS is an acronym for Instructional Management System. A project with partners from academic, commercial and government organizations which is putting in place the essential underpinnings for Internet-based education. The goal of the project is the widespread adoption of a set of specifications that will allow distributed learning environments to work together.

EXAMPLE 7

Metadata Framework—Standards-Based (SCORM) and Custom

Embodiments of the present invention provides methods for the immediate implementation of the following mandatory SCORM elements:
Title
Description
Location
Version
Status
Catalog Entry and Number
Metametadata-Identifier, Contribute, Language
Format
Cost
Copyright and Other Restrictions Additionally the following optional SCORM and domain specific metadata can be readily available. For example the sample list includes but is not limited to:
    Aggregation Levels
    Keywords
    Contribute-Role, vCard, Date
    Language
    Coverage
    Size
    Technical Requirement
    Installation Remarks
    Other Platform Requirements
    Duration
    Intended End User
    Typical Age Range/Proficiency Level
    Typical Learning Time
    Taxonomic Paths
    Relation-Kind-Resource
    Annotation-Description
    Accessibility-Access Profile Integration of additional organization metadata elements is also provided for such as:
    Available Delivery Media
    Subject Classification Structure
    Essential Skills including Vocabulary
    Resolution (For images)
    Any other unique identifiers and unique metadata within the organization.

Metadata can be incorporated into the metadata framework including but not limited to:
    Standard Source and Codes
    Organizational Standards and Objectives
    Competencies and Performance Support Objectives
    Other metadata to enable a task oriented delivery of distributed objects.

Again, the preceding examples were given as written illustrations of non-limiting embodiments of the present invention. One skilled in the art can appreciate the scope of the present invention. For example, SCORM used in an earlier example above stated a specific version. It is anticipated that all versions of SCORM are included but not limited to usage in various embodiments of the present invention.

It is further contemplated by yet another embodiment of the present invention to dynamically generate metadata records based on created or established metadata schema. Such generation may utilize servlets to perform processes that transform the metadata record into XML or appropriate format based on, but not limited to, standard and custom vocabulary and taxonomy accepted by a community of users of unique, disparate or federated database holdings. Servlets include but are not limited to programs that extend the functionality of a given environment. In terms of learning environments and web applications, servlets are to Web Servers what applets are for Web Browsers: just as applets extend the functionality of a browser, so do servlets (typically written in Java) add functions to Web Servers. Servlets are generated using special development kits such as delivered with the XML tools.

Still further, another embodiment discloses computer programs that can automatically extract data from an XML document, using its associated document type definition (DTD) or XML Schema Definition (XSD) which is a collection of XML declarations that, as a collection, defines the legal structure, elements, and attributes that are available for use in a document that complies with the DTD or XSD as a guide.

Another embodiment of the present invention discloses a simple method to provide a semantic web metadata convergence platform comprising the steps of
selecting at least one import metadata schema; and
generating at least one import metadata record using the at least one import metadata schema.

Given such simple methodology, various embodiments of the present invention relate to desktop applications as an automated process. MSD provides the interfaces and processes for non-programmatic users (normally Information Architecture/Domain Information Experts) to develop and deploy the metadata database for the metadata registry. MRC, provides the interfaces and processes for non programmatic users (used by subject matter experts and content providers) or automated systems to register, provide quality assurance if necessary and publish metadata (stored within the developed and deployed metadata database) and content (stored in distributed repositories, systems and organizations) described and pointed to (referenced) by the metadata. MRC Searching, used by all end users or systems is used to query the metadata stored within the metadata database to search for distributed content, access the content, generate metadata (in XML) of the content in various schemas, and create packages for transporting into other systems.

Yet a further embodiment of the present invention discloses that the systems or processes contemplated by the inventors need not be restricted to web-based systems. he embodiments of the present invention provide convergence platform tools where the tools are used to manage the metadata about the content, using the standards accepted or adopted by a community of ubiquitous or diverse users of unique, disparate or federated holdings in centralized or distributed environments rather than managing the content itself directly with these tools.

Various embodiments of the present invention also reduce the need of the user's computer skills. Further embodiments provide the ability for users without technical background and or computer programming skills (i.e. non-programmatic users) or other systems to create, establish, maintain, modify and administer a metadata database through easy to use interfaces and built-in business processes. The metadata database can be preloaded with standards-based metadata and accompanying metadata framework, that incorporates a standards-based metadata and domain specific metadata and accompanying metadata framework, and facilitates the management, representation, import/export of the in multiple schemas, without the need for any programming or technical/technology intervention. The metadata and metadata framework include industry specification and reference models for metadata and content interoperability and customizable metadata and metadata framework, unique taxonomies, ontology, organizational objectives and keyword vocabularies spanning all identified domains and application tasks. The system business process include the ability for non-programmatically.

Continuing, another embodiment of the present invention provides the ability to be connected in a federated network architecture of registries and repositories and perform all of the above functions and standards-based interoperability in a federated environment. MBSRS provides the ability to perform bi-directional communication (e.g. query, search, gathering, push, modify, update) with other systems or devices.

If the physical objects are distributed then the XML metadata file also contains the location information. A manifest file containing appropriate tags is contemplated by the present invention to serve a similar role to a "packing slip" by listing all objects used by the content package. The physical objects are a collection of objects physically accompanied with their metadata and included within a content package.

Metadata housekeeping, tracking and reporting functions are greatly enhanced. An embodiment of the present invention allows for an automatic purge of data based on established parameters of the system. For example, the system could be configured to delete all the records that are past a certain date. Still a further embodiment has the ability to offer transaction based usage and can keep track of the queries that were executed, who executed them, what data was retrieved and if there were any costs involved. This tracking information can be used for transaction based services.

SCORM content allows for interactivity through JavaScript. A SCORM API enables communication between the JavaScript within the content and the system in order to keep track of relevant data concerning the content, ie test scores and usage. Inherent is the capability to hold the data that has been gathered from the SCORM content and the tracking of non-SCORM objects.

An aspect of an embodiment of the present invention also discloses the ability to enforce Digital Rights of the objects in the system. For example, if the object contains metadata allowing certain rights, the system will abide by those rights. Additionally, the ability to report on the contents of the registry is disclosed. For example, reporting the type of content referenced in system or outlining the usage of the content. Alternative embodiments also disclose the ability to syndicate (publish) XML or RSS feeds to show availability (catalog) of content accessible by the system.

The following are additional non-limiting examples related to various embodiments of the present invention.

EXAMPLE 8

SCORM Content Packages as Data Packets with Manifest File

The content packaging defines a standardized method to exchange content. A Content Package is created to share content among other Sharable Content Object Reference Model (SCORM) conformant applications or systems. A Content Package is an abstract description of a unit of useable (and reusable) objects. The main elements of a Package are: a Manifest file, the physical objects and the eXtensible Markup Language (XML) metadata file of the physical objects.

If the physical objects are distributed then the eXtensible Markup Language (XML) metadata file also contains the location information. A manifest file containing appropriate tags is contemplated by the present invention to serve a similar role to a "packing slip" by listing all objects used by the content package. The physical objects are a collection of objects physically accompanied with their metadata and included within a content package.

Various embodiments of the present invention provide methods to create a content package by adding objects to a package in a compressed file, arranging the order of the objects within the content package, and describing the contents of the package based on IMS specifications as part of Sharable Content Object Reference Model (SCORM). IMS is an acronym for Instructional Management System. A project with partners from academic, commercial and government organizations which is putting in place the essential underpinnings for Internet-based education. The goal of the project is the widespread adoption of a set of specifications that will allow distributed learning environments to work The Metadata Based Semantic Registry System (MBSRS) also provides methods to package digital rights information along with Instructional Management System (IMS)/Sharable Content Object Reference Model (SCORM) metadata. For example, if the user chooses several objects and packages them together, the necessary digital rights information will be included within the package.

The location metadata in the package to the content may point to the content contained in the package, the Uniform Resource Locator (URL)/Uniform Resource Identifier (URI) to content on the Internet, or may contain an identifier such as a Digital Object Identifier (DOI), a Metadata Based Semantic Registry System (MBSRS) Identifier or an alternative persistent identifier. The persistent identifiers like MBSRS ID or DOI will be used to enable the tracking of access and usage of the content that has been distributed outside of the MBSRS system or federated network.

EXAMPLE 9

Automated Object Registration

An embodiment of the present invention allow systems to automatically register objects into the Metadata Based Semantic Registry System (MBSRS). Systems send eXtensible Markup Language (XML) document(s) and/or binary data containing metadata corresponding to the contents of the data that it describes into the MBSRS, the MBSRS processes the XML and/or binary data and registers the object into the MBSRS. The actual data may be moved into a designated content area, database or remained unmoved and referenced by its location via an Uniform Resource Identifier (URI), Digital Object Identifier (DOI), or other identifier. The object is then accessible via the MBSRS.

EXAMPLE 10

Content Syndication

Another embodiment of the present invention provide methods that enable the publishing of eXtensible Markup Language (XML) or Resource Description Framework (RDF) documents representing the contents of the Metadata Based Semantic Registry System (MBSRS). The documents are accessible from a particular interface within the MBSRS, typically a Uniform Resource Locator (URL). The document is processed either statically (preprocessed) or dynamic based on parameters contained with the URL string, ex http://[server]/[name]?feedType=RSS&keyword=Headlines. This example will produce a document based on the RDF Site Summary (RSS) schema of the metadata of the objects that have a keyword of "Headlines". As more objects with the keyword "Headlines" get registered into the system, the contents of the document will change to reflect the additional objects. This URL can be used by newsreaders, portals, or other systems.

EXAMPLE 11

Schema Transformation

Further embodiments of the present invention provide methods to enable the schema transformation necessary to meet the needs of the required communication. For example, if a user or system requests an object from the system and requires it be in a certain format or schema, the Metadata Based Semantic Registry System (MBSRS) will give the requester the object's contents in that format or schema. An example of that would be if the Uniform Resource Locator (URL) was http://[server]/[name]?feedType=RSS&keyword=Headlines, the system would respond with a document with a RDF Site Summary (RSS) schema, while http://[server]/[name]?feedType=atom&keyword=Headlines, would respond with a document with an atom schema. Atom is a format for syndicating data.

The system does this transformation not only for content syndication, but for all communication with other systems. For example, if an object's schema uses the standard Learning Object Metadata (LOM) Institute of Electrical and Electronics Engineers (IEEE) 1484 schema, but needs to communicate with another system that does not conform to these specifications the system can transform the schema to the format or schema of the other system. The system can also register objects from multiple schemas.

EXAMPLE 12

Transaction Based Usage

Various embodiments of the present invention provide methods to enable the tracking of accessed content by means of metadata derived from or contained in the Metadata Based Semantic Registry System (MBSRS). For example, if a user or system accesses content that is referenced by obtaining it from an attribute of metadata that was stored within the MBSRS, the access will be tracked and the information of who, what, when and how that content was accessed will be stored. This data will be used for billing and/or analysis purposes. Ad Hoc queries on the MBSRS will also be tracked and that data can also be used for billing and/or analysis purposed.

The MBSRS also provides methods to track the usage within the content itself by utilizing the Sharable Content Object Reference Model (SCORM) Application Program Interface (API). For example, if the user accessed the content and it is determined to be SCORM enabled, the system will provide a SCORM API to allow the content's data to be stored in the MBSRS.

The MBSRS also provides methods to enforce digital rights of the content. The usage and cost rights of the content can be viewed and must be complied with prior to and during the access of the content. For example, if the user chooses the particular object and there are corresponding digital rights, the user will be prompted to enter either credentials or payment information. This process is also accessible to automated systems, although the payment information will be setup either prior to or in an automated fashion and digital rights will carry along with the content as metadata.

The MBSRS provides methods to distribute encrypted containers that contain digital rights information gathered from the MBSRS. When accessed, prompts the user to enter credentials or payment information. Information can be relayed back to a main server for tracking access and usage.

EXAMPLE 13

Embedded Application

The Metadata Based Semantic Registry System (MBSRS) and all of its functions can reside in a hardware device specifically designed for a particular function. This hardware device can use the entire MBSRS as its foundational platform or utilize particular components of the MBSRS as additional functionality for the device. MBSRS can also be used as a component or foundation for a commercial or non-commercial application. For example, a proprietary application vender can choose to embed the MBSRS functionality into their application, that application can then be distributed onto various platforms.

EXAMPLE 14

Reporting Capabilities

An embodiment of the present invention provide enables the reporting of contents within the Metadata Based Semantic Registry System (MBSRS), access of content and metadata, and billing information of the system. Such as, a user or administrator can run a report and see that John Doe registered 20 objects in the last 30 days, he accessed 30 content objects, and owes a total of $5.25.

EXAMPLE 15

Expiration Process

Still another embodiments of the present invention provide methods to enable the expiration of data within the Metadata Based Semantic Registry System (MBSRS) based on predetermined criteria. Since large amounts of data can be automatically registered into the MBSRS, the system has the ability to automatically purge objects and their corresponding data based on rules set by a user or administrator. As a sample, if the system gets 1000 GB of data for the week consisting of 15,000 objects. The system can be configured to delete the objects that have an attribute "importance level" below 5, on a 1-10 scale, which would decrease the amount of data in the system. The user/administrator can also choose to archive the data into an alternative repository or file system.

EXAMPLE 16

Computers and Alternate Hardware Devices

Hardware devices contemplated by the present can include but are note limited to hardwired specialized components that do machine processing and/or devices containing known or future operating systems (e.g Linux or Windows versions). Hardware contemplated by an embodiment of the present invention are selected from the group consisting of but not limited to: personal digital assistants; portable music players; cell phones; smart phones; entertainment related digital equipment; hand-held personal computers; personal computers; telecommunications equipment; and combinations or derivatives thereof.

EXAMPLE 17

MBSRS, DOI & SCORM Alternative Definitions

Metadata Based Semantic Registry System (MBSRS Identifier)—Object ID of the MBSRS Identifier Object in the MSSRS. The object can be referenced externally by referencing the URL, of the instance of MBSRS along with the Object ID of the object. For example, to externally access particular content, the URL would look similar to this: http://[serverName]/[webapp]/?ID=192.168.0.5:13e3940:101862c2c5e:-7ffe. The object consists of the Internet Protocol (IP) address of the server which the object was first registered along with a set of digits unique to that object. This identification mechanism can be changed and may incorporate Digital Object Identifier (DOI).

Digital Object Identifier (DOI) is a system for identifying content objects in the digital environment. DOI's are names assigned to any entity for use on digital networks. They are used to provide current information, including where they (or information about them) can be found on the Internet. Information about a digital object may change over time, including where to find it, but its DOI will not change.

Sharable Content Object Reference Model (SCORM) enabled or (Sharable Content Object) SCO—Having the necessary handle within the content to communicate with a SCORM API. Usually consisting of embedded JavaScript, but may include other communication mechanisms.

EXAMPLE 18

Vehicle Fleet Information Service

Built upon various embodiments of the present invention, methods are provided for managing large amounts of distributed multimedia content through XML event 'metadata'. Provided is a distributed registry for automated cataloging and discovery of multimedia 'event content' over the Internet. Event metadata is 'registered' by reading 'tags' within the XML stream received from each Video Event Data Recorder (VEDR) over a WiFi; cellular network; or other telecommunications network. The resultant system places the multimedia event content and metadata into local and global repositories providing a platform for automated reported such as: Event Review; Driver Feedback; Training; Learning Management; and Claims Handling functionalities.

Each Media Server at each fleet depot to automatically index and manage all event metadata as well as the rich media 'event content' as it is received from each VEDR.

Duplications are made of all event metadata from all fleet depot Media Servers as well as duplicate copies of all content from events defined as 'critical' such as an accident.

Still further, systems contemplated can be tailored to address the requirements of a vertical transportation market or an individual fleet. These market-specific requirements may include specific hardware requirements in the vehicle or at the depot. Or the requirements may be specific applications such as driver identification, additional cameras or complex sensor integration. Additionally, various embodiments can also be integrated at the 'service platform' level with other real-time fleet management systems to provide gapless satellite & cellular coverage. The service can also be integrated with E-911 & Automated Call Notification (ACN) systems—including a 'First Notice of Loss' notification to fleet operators and insurance companies when an event or emergency occurs.

The preceding additional examples were given as written illustrations of non-limiting embodiments of the present invention. One skilled in the art can appreciate the scope of the present invention.

Unless otherwise indicated, all numbers expressing quantities of ingredients, properties such as data, database parameters, reaction conditions, and so forth in the specification and embodiments are to be understood as being modified in all instances by the term "about." Accordingly, unless indicated to the contrary, the numerical parameters set forth in the specification are approximations that may vary depending upon the desired properties sought to be obtained by the present invention. At the very least, and not as an attempt to limit the application of the doctrine of equivalents to the scope of the embodiments, each numerical parameter should at least be construed in light of the number of reported significant digits and by applying ordinary rounding techniques. Notwithstanding, numerical ranges and parameters setting forth the broad scope of the invention are approximations, the numerical values set forth are reported as precisely as possible. Numerical values, however, inherently contain certain errors necessarily resulting from the standard deviation found in their respective testing measurements.

The terms "a" and "an" and "the" and similar referents are used in the context of describing the invention and are to be construed to cover both the singular and the plural, unless otherwise indicated herein or clearly contradicted by context. Recitations of ranges of values herein are merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all definitions, examples, or exemplary language (e.g. "such as") provided herein is intended merely to better illustrate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended embodiments.

Exemplary embodiments of this invention are described herein, including the best mode known to the inventors for carrying out the invention. Of course, variations on those exemplary embodiments will become apparent to those of ordinary skill in the art upon reading the foregoing description. Accordingly, this invention includes all modifications and equivalents of the subject matter recited in the embodiments appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

In addition, the embodiments of the present invention, without limitation, can be used in research, product manufacturing, and data access systems or used calibration systems as in accordance with the appropriate research, clinical trial, manufacturing or treatment protocols or procedures approved by the appropriate governing institutions having authority to recommend, approve, evaluate or regulate such protocols or procedures.

What is claimed is:

1. A metadata convergence platform implemented in a digital environment and comprising:
   a communication system in electronic communication with
      a first content repository comprising, in digital form,
         a first content comprising at least a first kind of media, and
         first metadata comprising attributes respecting the first content, and
      a second content repository disparate from the first content repository and comprising, in digital form,
         a second content comprising at least a second kind of media different from the first kind of media, and
         second metadata comprising attributes respecting the second content,
   the communication system receiving at least a portion of the first metadata and the second metadata from the first and second content repositories, respectively;
   a metadata registry accessible via the Internet by a user device, the metadata registry receiving and storing, in digital form, a plurality of metadata schemas including
      a first metadata schema concerning the first kind of media, and
      a second metadata schema different from the first metadata schema and concerning the second kind of media; and
   a control system in communication with the communication system and the metadata registry and configured to:
      incorporate the first metadata into the first metadata schema to produce a first metadata record;
      incorporate the second metadata into the second metadata schema to produce a second metadata record; and
      transmit the first and second metadata records to the metadata registry;
   the metadata convergence platform being configured to:
      receive a query from the user device, the query comprising a required schema and one of a first identifier of the first content and a second identifier of the second content;
      determine whether the query contains the first identifier or the second identifier;
      responsive to a determination that the query contains the first identifier:
         identify the first metadata record in the metadata registry using the first identifier;
         locate, using the first metadata record, the first content within the first repository;
         retrieve the first content from the first repository;
         transform the first metadata record from the first metadata schema to the required schema to generate the first metadata in the required schema; and
         deliver the first content and the first metadata in the required schema to the user device; and responsive to a determination that the query contains the second identifier:
    identify the second metadata record in the metadata registry using the second identifier;
    locate, using the second metadata record, the second content within the second repository;
    retrieve the second content from the second repository;
    transform the second metadata record from the second metadata schema to the required schema to generate the second metadata in the required schema; and
    deliver the second content and the second metadata in the required schema to the user device.

2. The metadata convergence platform of claim 1, wherein the first media comprises audio.

3. The metadata convergence platform of claim 2, wherein the second media comprises video.

4. The metadata convergence platform of claim 1, wherein the metadata registry comprises:
    a metadata database storing a plurality of metadata records, the plurality of metadata records including the first metadata record and the second metadata record; and
    a metadata schema development (MSD) component comprising one or more MSD interfaces presentable to a plurality of non-programmatic users to enable the non-programmatic users to set up a metadata framework comprising a plurality of metadata schemas, the plurality of metadata schemas including the first metadata schema and the second metadata schema.

5. The metadata convergence platform of claim 4, wherein the MSD component enables the non-programmatic users to manage a URL of each of a plurality of content repositories including both of the first content repository and the second content repository.

6. The metadata convergence platform of claim 4, wherein the metadata registry further comprises a metadata record creation (MRC) component comprising one or more MRC interfaces presentable to the plurality of non-programmatic users to enable the non-programmatic users to register in the metadata registry a plurality of objects stored in a plurality of content repositories including the first content repository and the second content repository.

7. The metadata convergence platform of claim 6, wherein the MRC interfaces further enable the non-programmatic users to provide quality assurance of one or more of the plurality of metadata records stored in the metadata database.

8. The metadata convergence platform of claim 6, wherein the MRC interfaces further enable the non-programmatic users to publish one or more of the plurality of metadata records stored in the metadata database.

9. The metadata convergence platform of claim 6, wherein the metadata registry further comprises a MRC search component comprising one or more MRC search interfaces presentable to a first end user via the user device and enabling the first end user to submit the query to the metadata convergence platform.

10. The metadata convergence platform of claim 1, wherein the first metadata schema is established using a first international metadata standard.

11. The metadata convergence platform of claim 10, wherein the first international metadata standard comprises Shareable Content Object Reference Model (SCORM).

12. The metadata convergence platform of claim 10, wherein the second metadata schema is established using a second international metadata standard.

13. The metadata convergence platform of claim 10, wherein the second metadata schema comprises a user community unique schema.

14. The metadata convergence platform of claim 1, wherein the metadata registry is centralized and both of the first content repository and the second content repository are distributed, and wherein the first metadata record comprises a first reference to the first content and the second metadata record comprises a second reference to the second content, the metadata convergence platform using the first reference to locate the first content or using the second reference to locate the second content in response to the query.

15. The metadata convergence platform of claim 1, wherein the metadata registry comprises:
    one or more documents representing a plurality of metadata records stored in the metadata registry, the plurality of metadata records including the first metadata record and the second metadata record; and
an interface accessible by one or more other systems, the one or more documents being accessible by the interface.

16. A method of converging metadata of content from different content repositories, the method comprising:
    receiving, in a convergence platform in electronic communication with
        a first content repository storing a first content comprising a first kind of media and
        a second content repository disparate from the first content repository and storing a second content comprising a second kind of media different from the first kind of media,
    a first metadata from the first content repository, the first metadata describing the first content;
    receiving, in the convergence platform, a second metadata from the second repository, the second metadata describing the second content;
    incorporating, by the convergence platform, the first metadata into a first metadata schema to produce a first metadata record;
    incorporating, by the convergence platform, the second metadata into a second metadata schema to produce a second metadata record;
    storing, by the convergence platform in a metadata registry of the convergence platform, the first and second metadata records;
    receiving, by the convergence platform, a first query sent from a first user device, the first query comprising a required schema and a first identifier of the first content;
    identifying, by the convergence platform, the first metadata record in the metadata registry using the first identifier;
    locating, by the convergence platform from the first metadata record, the first content within the first content repository;
    retrieving, by the convergence platform, the first content from the first content repository;
    transforming, by the convergence platform, the first metadata record to generate the first metadata in the required schema; and
    delivering, by the convergence platform, the first content and the first metadata in the required schema to the first user device;
    receiving, by the convergence platform, a second query from a second user device, the second query comprising the required schema and a second identifier of the second content;
    identifying, by the convergence platform, the second metadata record in the metadata registry using the second identifier;

locating, by the convergence platform from the second metadata record, the second content within the second content repository;

retrieving, by the convergence platform, the second content from the second content repository;

transforming, by the convergence platform, the second metadata record to generate the second metadata in the required schema; and delivering, by the convergence platform, the second content and the second metadata in the required schema to the second user device.

17. The method of claim 16 wherein the metadata registry is centralized and the first and second content repositories are distributed.

18. The method of claim 16, wherein the first metadata schema comprises a standards-based metadata schema and the second metadata schema comprises a user community unique schema.

19. The method of claim 16, wherein the first metadata schema comprises a first metadata import schema and the second metadata schema comprises a second metadata import schema, the method further comprising:

submitting, by the metadata convergence platform, the first metadata record and the second metadata record to a metadata conversion staging area;

selecting, by the metadata convergence platform, a metadata export schema;

converting, by the metadata convergence platform, the first metadata record into a first export metadata record based on the metadata export schema;

converting, by the metadata convergence platform, the second metadata record into a second export metadata record based on the metadata export schema;

storing, by the metadata convergence platform in the metadata registry, the first export metadata record and the second export metadata record; and delivering one or both of the first export metadata record and the second export metadata record to one of a plurality of user devices including the first user device and the second user device.

20. A metadata convergence platform implemented in a digital environment and comprising:

a communication system in electronic communication with a first content repository and a second content repository remote from the first content repository;

a metadata registry storing a plurality of metadata records including:

a first metadata record comprising first metadata stored according to a first metadata schema, the first metadata comprising attributes respecting a first content stored in the first content repository; and a second metadata record comprising second metadata stored according to a second metadata schema different from the first metadata schema, the second metadata comprising attributes respecting a second content stored in the second content repository; and a control system in communication with the communication system and the metadata registry and configured to:

receive a query from a user device in communication with the metadata convergence platform, the query comprising a required schema and one of a first identifier of the first content and a second identifier of the second content;

determine whether the query contains the first identifier or the second identifier;

responsive to a determination that the query contains the first identifier:

identify the first metadata record in the metadata registry using the first identifier;

locate the first content within the first repository using the first metadata record;

retrieve the first content from the first repository;

transform the first metadata record from the first metadata schema to the required schema to generate the first metadata in the required schema; and deliver the first content and the first metadata in the required schema to the user device; and responsive to a determination that the query contains the second identifier:

identify the second metadata record in the metadata registry using the second identifier;

locate the second content within the second repository using the second metadata record;

retrieve the second content from the second repository;

transform the second metadata record from the second metadata schema to the required schema to generate the second metadata in the required schema; and deliver the second content and the second metadata in the required schema to the user device.

* * * * *